(12) United States Patent
Nakamoto et al.

(10) Patent No.: US 9,985,448 B2
(45) Date of Patent: *May 29, 2018

(54) ELECTRIC STORAGE DEVICE PROTECTION APPARATUS, ELECTRIC STORAGE APPARATUS, STARTER BATTERY, AND METHOD OF PROTECTING ELECTRIC STORAGE DEVICE

(71) Applicant: GS Yuasa International Ltd., Kyoto-shi (JP)

(72) Inventors: Takeshi Nakamoto, Kyoto (JP); Yoshihiko Mizuta, Kyoto (JP); Takeyuki Shiraishi, Kyoto (JP)

(73) Assignee: GS YUASA INTERNATIONAL LTD, Kyoto-Shi, Kyoto (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/179,123

(22) Filed: Jun. 10, 2016

(65) Prior Publication Data

US 2016/0285291 A1 Sep. 29, 2016

Related U.S. Application Data

(63) Continuation of application No. 14/254,777, filed on Apr. 16, 2014, now Pat. No. 9,385,545.

(30) Foreign Application Priority Data

Apr. 25, 2013 (JP) .................................. 2013-092686

(51) Int. Cl.
*H02J 7/00* (2006.01)
*B60L 11/18* (2006.01)

(52) U.S. Cl.
CPC ......... *H02J 7/0031* (2013.01); *B60L 11/1809* (2013.01); *B60L 11/1851* (2013.01);
(Continued)

(58) Field of Classification Search
CPC .... H02H 7/16; H02J 7/345; H02J 2007/0037; H02J 2007/004; H02J 7/0031;
(Continued)

(56) References Cited

U.S. PATENT DOCUMENTS 9,385,545 B2 * 7/2016 Nakamoto .......... B60L 11/1809
2002/0017893 A1 * 2/2002 Duff, Jr. ................. H01G 9/155
320/100

(Continued)

FOREIGN PATENT DOCUMENTS

CN 202856431 U 4/2013
JP H 09-238429 A 9/1997
(Continued)

OTHER PUBLICATIONS

U.S Notice of Allowance dated Feb. 29, 2016 in U.S. Appl. No. 14/254,777.

(Continued)

*Primary Examiner* — Binh Tat
(74) *Attorney, Agent, or Firm* — McGinn IP Law Group, PLLC.

(57) ABSTRACT

An electric storage device protection apparatus includes switches arranged between an electric device and an electric storage device and connected in parallel to each other, and each of which being configured to be switched to be in an open state and a closed state, a rectifier component connected in series to one of the switches between a pair of common connection points of the switches, and a controller configured to perform a process to make the one of the switches that is connected to the rectifier component to be in the closed state and make another one of the switches to be in the open state when determining that the electric storage device is in a state where a voltage of the electric storage device becomes higher than a reference range.

12 Claims, 8 Drawing Sheets

(52) U.S. Cl.
CPC ......... *B60L 11/1861* (2013.01); *H02J 7/0034* (2013.01); *H02J 7/0068* (2013.01); *H02J 2007/004* (2013.01); *H02J 2007/0037* (2013.01)

(58) Field of Classification Search
CPC ....... H02J 7/0034; H02J 7/0068; Y02E 70/40; Y02E 320/166; Y02E 320/10; Y02E 320/107; Y02E 320/128; Y02E 320/136; Y02E 320/16; Y02E 315/02; H01G 9/155; A63F 2009/2494; A63F 2009/2492; B29C 33/38
USPC .................................................. 320/106–115
See application file for complete search history.

(56) References Cited

U.S. PATENT DOCUMENTS

| | | | |
|---|---|---|---|
| 2004/0061478 A1* | 4/2004 | French | F02M 51/04 320/108 |
| 2009/0189568 A1 | 7/2009 | Vasselin et al. | |
| 2012/0217932 A1* | 8/2012 | Biebach | H01M 10/441 320/126 |
| 2012/0293126 A1 | 11/2012 | Nakamoto et al. | |
| 2013/0009466 A1 | 1/2013 | Kumagai | |
| 2013/0200860 A1 | 8/2013 | Takeda | |
| 2014/0028103 A1 | 1/2014 | Lai et al. | |

FOREIGN PATENT DOCUMENTS

| | | |
|---|---|---|
| JP | 10-271699 A | 10/1998 |
| JP | 2002-508646 A | 3/2002 |
| JP | 2008-228449 A | 9/2008 |
| JP | 2010-040256 A | 2/2010 |
| JP | 2010-257884 A | 11/2010 |
| JP | 2011-029009 A | 2/2011 |
| JP | 2011-228293 A | 11/2011 |
| JP | 2013-018464 A | 1/2013 |

OTHER PUBLICATIONS

U.S. Office Action dated Oct. 21, 2015 in U.S. Appl. No. 14/254,777.
Specification and Drawings of U.S. Appl. No. 14/048,789, filed Oct. 8, 2013.
Extended European Search Report dated Apr. 21, 2015.

* cited by examiner

ELECTRIC STORAGE DEVICE PROTECTION APPARATUS, ELECTRIC STORAGE APPARATUS, STARTER BATTERY, AND METHOD OF PROTECTING ELECTRIC STORAGE DEVICE

The present application is a Continuation application of U.S. patent application Ser. No. 14/254,777, filed on Apr. 16, 2014, which is based on and claims priority from Japanese Patent Application No. 2013-092686, filed on Apr. 25, 2013, the entire contents of which are incorporated herein by reference.

FIELD

Technologies described herein relates to a technology for monitoring a state of an electric storage device.

BACKGROUND

Conventionally, there has been a current control circuit that restricts occurrence of overcharge or overdischarge of a secondary battery (e.g. JP-A-2013-018464). Such a current control circuit includes a circuit including a first diode and a first switch that are connected to each other in series and a circuit including a second diode and a second switch that are connected to each other in series, and such two circuits are connected to each other in parallel. The first diode is connected so as to block a current flowing in a discharge direction that discharges electric power from the secondary battery, and the second diode is connected so as to block a current flowing in a charge direction that charges the secondary battery with electric power.

In the current control circuit, if the first switch is in a closed state and the second switch is in an open state, the current flowing in the discharge direction is blocked by the first diode, and accordingly, the secondary battery is less likely to become in the overdischarge state. In the current control circuit, if the first switch is in the open state and the second switch is in the closed state, the current flowing in the charge direction is blocked by the second diode, and accordingly, the secondary battery is less likely to become in the overcharge state.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the above-described technology, the current always flows through one of the first diode and the second diode regardless of whether the secondary battery is in the overdischarge state or the overcharge state. Therefore, the diode may be heated excessively.

This specification describes a technology for restricting occurrence of heating by a rectifier component such as the diode and less causing the electric storage device such as the secondary battery to become in the overcharge state or the overdischarge state.

An electric storage device protection apparatus described in this specification includes switches arranged between an electric device and an electric storage device and connected in parallel to each other, and each of which being configured to be switched to be in an open state and a closed state, a rectifier component connected in series to one of the switches between a pair of common connection points of the switches, and a controller. The controller is configured to perform a first process to make the one of the switches that is connected to the rectifier component to be in the open state when determining that the electric storage device is in a first state where a voltage of the electric storage device is within a reference range, and perform a second process to make the one of the switches that is connected to the rectifier component to be in the closed state and make another one of the switches to be in the open state when determining that the electric storage device is in a second state where a voltage of the electric storage device becomes outside the reference range due to a current flowing in a reverse direction of the rectifier component.

According to the above configuration, heating by the rectifier component is less likely to occur and an electric storage device is less likely to become in an overcharge state or an overdischarge state.

BRIEF DESCRIPTION OF DRAWINGS

The foregoing and other features of the present invention will become apparent from the following description and drawings of an illustrative embodiment of the invention in which.

DESCRIPTION OF EMBODIMENTS

An electric storage device protection apparatus described in this specification includes switches arranged between an electric device and an electric storage device and connected in parallel to each other, and each of which being configured to be switched to be in an open state and a closed state, a rectifier component connected in series to one of the switches between a pair of common connection points of the switches, and a controller. The controller is configured to perform a first process to make the one of the switches that is connected to the rectifier component to be in the open state when determining that the electric storage device is in a first state where a voltage of the electric storage device is within a reference range, and perform a second process to make the one of the switches that is connected to the rectifier com- ponent to be in the closed state and make another one of the switches to be in the open state when determining that the electric storage device is in a second state where a voltage of the electric storage device becomes outside the reference range due to a current flowing in a reverse direction of the rectifier component.

With this apparatus, as long as it is not determined that the electric storage device is in the second state, the path of a current flowing via the rectifier component is not formed, and this restricts occurrence of heating by the rectifier component. When it is determined that the electric storage device is in the second state, the path of a current flowing via the rectifier component is formed. Therefore, the current flows only in the discharge direction, and accordingly, the electric storage device is less likely to be in the overcharge state.

In the electric storage device protection apparatus, the switches may include a first switch and a second switch, and the first switch may be arranged between the electric device and the electric storage device and switched between the open state and the closed state, and the second switch may be connected in parallel to the first switch between the electric device and the electric storage device and switched between the open state and the closed state. The rectifier component may be connected in series to the second switch between the pair of common connection points of the first switch and the second switch. The controller may be configured to make at least the first switch to be in the closed state when determining that the electric storage device is in the first state, and make the first switch to be in the open state and make the second switch to be in the closed state when determining that the electric storage device is in the second state.

With this electric storage device protection apparatus, when the electric storage device is in the first state, at least the first switch becomes in the closed state. The first switch is not connected in series to the rectifier component, and therefore, compared to a configuration where the first switch is connected in series to the rectifier component, occurrence of heating by the rectifier component is restricted. When the electric storage device is in the second state, the first switch becomes in the open state and the second switch becomes to be in the closed state. Accordingly, a current flowing in the reverse direction of the rectifier component is blocked by the rectifier component. Therefore, the electric storage device is less likely to become in the overcharge state by the current flowing in the reverse direction of the rectifier component.

In the electric storage device protection apparatus, the electric device may include a charger and a load, and the first switch, the second switch, and the rectifier component may be connected to a common current path commonly arranged between the charger and the electric storage device and between the load and the electric storage device.

With this electric storage device protection apparatus, by performing the second process, the first switch becomes in the open state and the second switch becomes in the closed state. Accordingly, the current path through which the current flows in the forward direction of the rectifier component is less likely to be blocked.

In the electric storage device protection apparatus, the controller may be configured to make the second switch to be in the closed state first and thereafter make the first switch to be in the open state in the second process.

With this electric storage device protection device, during the performance of the second process, both of the first switch and the second switch are not in the open state at the same time, and therefore, the current flowing in the forward direction of the rectifier component is not blocked for a moment.

In the electric storage device protection apparatus, the controller may be further configured to determine whether the electric storage device is in a third state where the voltage of the electric storage device becomes outside the reference range due to a current flowing in a forward direction of the rectifier component, and perform a third process to make the first switch and the second switch to be in the open state when determining that the electric storage device is in the third state.

With this electric storage device protection apparatus, when the electric storage device is in the third state, the first switch and the second switch become to be in the open state. Accordingly, the electric storage device is less likely to become in the overdischarge state by the current flowing in the forward direction of the rectifier component.

The electric storage device protection apparatus may further include a discharger connected in parallel to the electric storage device and configured to be switched between a discharge state where electric power is discharged from the electric storage device and a stop state where discharge is stopped. In the electric storage device protection apparatus, the rectifier component may be connected to the second switch so as to block a current flow that charges the electric storage device, and the controller may be further configured to perform the stop process to make the discharger in the stop state when determining that the electric storage device is in the first state, and perform the discharge process to make the discharger in the discharge state when determining that the electric storage device is in the second state.

With this electric storage device protection apparatus, when the electric storage device is in the second state, the discharger becomes in the discharge state and discharges electric power from the electric storage device. Therefore, compared to a configuration without including the discharger, the electric storage device is further less likely to become in the overcharge state by the current flowing in the reverse direction of the rectifier component.

In the electric storage device protection apparatus, the controller may be further configured to make the second switch to be in the open state in the first process.

With this electric storage device protection apparatus, the current flowing through the rectifier component is blocked and this surely restricts occurrence of heating by the rectifier component.

An electric storage apparatus described in this specification includes an electric storage device and the electric storage device protection apparatus.

The electric storage device may include a positive electrode material including a lithium compound containing an iron component and a specific lithium compound as a positive electrode active material, the specific lithium compound providing an open circuit voltage greater than an open circuit voltage provided by the lithium compound containing the iron compound included as the positive electrode active material, and the open circuit voltage being obtained in a flat region where a change rate of the open circuit voltage per a state of charge unit is small.

Accordingly, compared to a configuration without adding a high voltage adaption material, the change ratio reduces in a region where the change ratio of the open circuit voltage per unit charge state is great. This restricts occurrence of abrupt change of the OCV in a region that the charge state is close to a full charge state.

The invention described in this specification may be achieved in various methods such as a controller, a control method, a computer program achieving functions of the controller or the control method, or a recording medium storing the computer program.

First Embodiment

A first embodiment will be described with reference to FIGS. 1 to 7.

Figure 1:
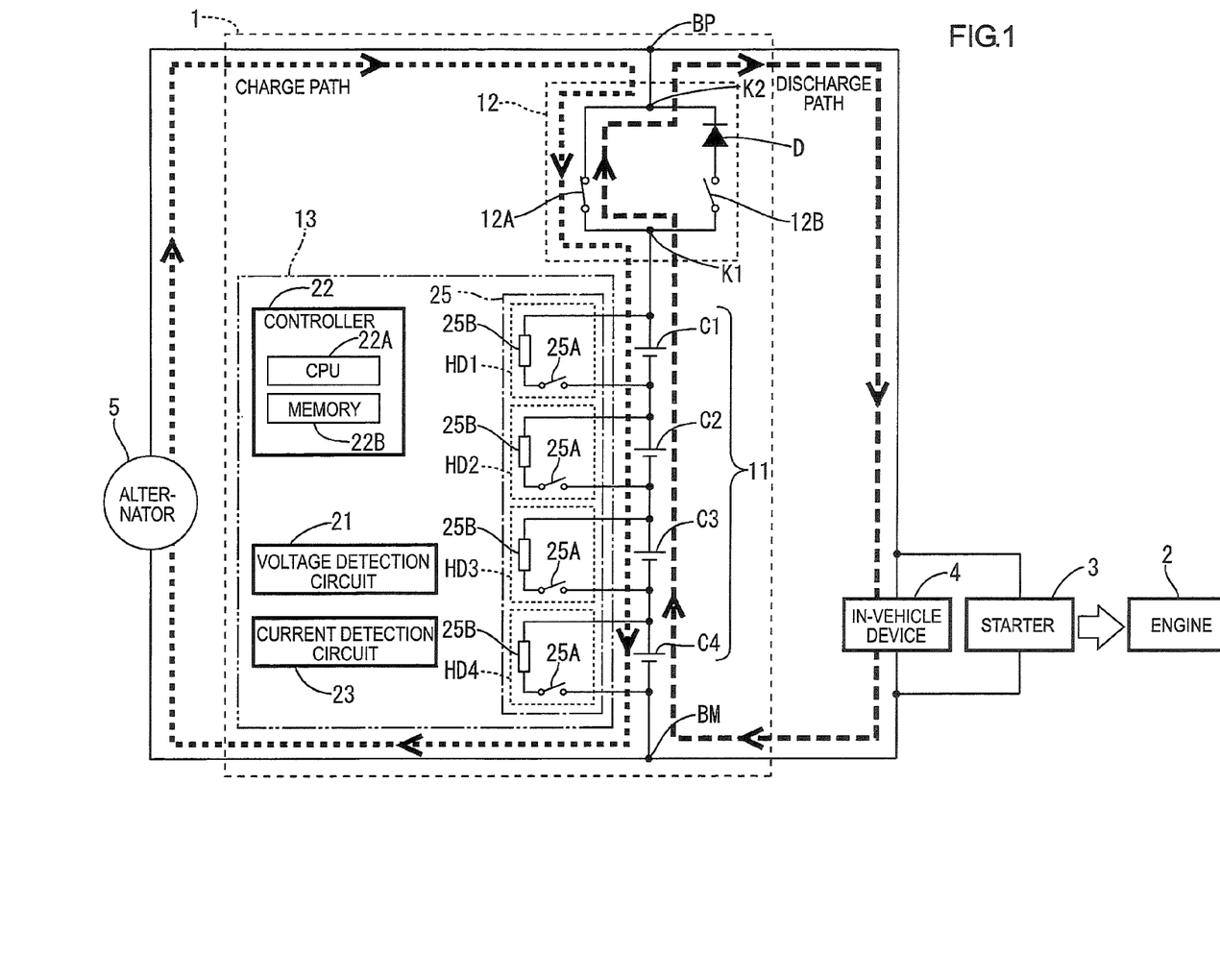
FIG. 1 is a block diagram of an electric storage apparatus according to one embodiment.

As illustrated in FIG. 1, an electric storage apparatus 1 of the present embodiment is mounted to a vehicle such as an engine vehicle and a hybrid vehicle and is a starter battery that supplies electric power to a starter 3 to start an engine 2. The electric storage apparatus 1 supplies electric power to an in-vehicle device 4 such as head lights, an audio system or a security system. The electric storage apparatus 1 is charged with electric power that is generated by an alternator 5 according to rotation of the engine 2. The starter 3 and the in-vehicle device 4 are examples of loads to which electric power is supplied from the electric storage apparatus 1. The alternator 5 is one example of a charger that charges the electric storage apparatus 1 or a power generator. The loads and the charger are examples of electric devices.

Configuration of Electric Storage Apparatus

The electric storage apparatus 1 includes an assembled battery 11, a circuit switch 12, and a battery management system (BMS) 13. The assembled battery 11 is one example of the electric storage device and includes a plurality of cells CN that are connected in series to each other. Each of the cells CN is a secondary battery that is rechargeable. Specifically, each of the cells CN is a lithium ion secondary battery that includes a negative electrode including a graphite-based material as a negative electrode active material and a positive electrode including an iron phosphate-based material as the positive electrode active material. In FIG. 1 and in the following description, the assembled battery 11 includes four cells C1 to C4. A combination of the circuit switch 12 and the BMS 13 configure one example of the electric storage device protection apparatus.

The assembled battery 11 is connected to the starter 3, the in-vehicle device 4 and the alternator 5 via the circuit switch 12. The circuit switch 12 is connected between the alternator 5 and the assembled battery 11 and between the in-vehicle device 4 and the assembled battery 11. The circuit switch 12 is arranged on a common current path through which the discharge current flows from the assembled battery 11 to the starter 3 and the charge current flows from the alternator 5 to the assembled battery 11.

The circuit switch 12 includes a first relay 12A, a second relay 12B, and a diode D, and the first relay 12A and the second relay 12B are connected to each other in parallel. The first relay 12A is a contact-type relay (a mechanical switch) including a contact point and a magnetic coil, for example. If receiving an open command signal from a controller 22 that will be described later, the first relay 12A mechanically opens the contact point by an electromagnetic action (an open state or an OFF state). If receiving a close command signal from the controller 22 that will be described later, the first relay 12A mechanically closes the contact point by the electromagnetic action (a closed state or an ON state). The second relay 12B has a configuration same as the first relay 12A.

The diode D is connected in series to the second relay 12B between a pair of common connection points K1 and K2 each of which is commonly connected to the first relay 12A and the second relay 12B. Specifically, the diode D is connected in series to the second relay 12B such that an anode side thereof is connected to the common connection point K1 and a cathode side thereof is connected to the common connection point K2. In other words, the diode D is connected to block the electric current flowing in a charge direction that charges the assembled battery 11. The diode D is one example of a rectifier component. The diode D is not connected to the first relay 12A between the pair of common connection points K1 and K2.

When the first relay 12A or the second relay 12B is in the closed state, a path of a current is formed between the assembled battery 11, the starter 3, the in-vehicle device 4 and the alternator 5. Specifically, if at least the first relay 12A is in the closed state, a current path (hereinafter, referred to as a discharge path) is formed between the assembled battery 11, the starter 3, and the in-vehicle device 4 via the first relay 12A. This enables the electric power to be supplied from the assembled battery 11 to the starter 3 and the in-vehicle device 4. A current path (hereinafter, referred to as a charge path) is formed between the assembled battery 11 and the alternator 5 via the first relay 12A. This enables the electric power to be supplied from the alternator 5 to the assembled battery 11.

If the first relay 12A is in the open state and the second relay 12B is in the closed state, the discharge path is formed between the assembled battery 11, the starter 3, and the in-vehicle device 4 via the second relay 12B. This enables the electric power to be supplied from the assembled battery 11 to the starter 3 and the in-vehicle device 4. The charge path is formed between the assembled battery 11 and the alternator 5 via the second relay 12B. However, the diode D is connected to block the current flowing in the charge direction that charges the assembled battery 11. Therefore, the electric power is not supplied from the alternator 5 to the assembled battery 11.

The first relay 12A and the second relay 12B may be arranged outside the electric storage apparatus 1. The first relay 12A is one example of the first switch and the second relay 12B is one example of the second switch.

The BMS 13 includes a voltage detection circuit 21, the controller 22, a current detection circuit 23, and an equalization circuit 25. The voltage detection circuit 21 is one example of a voltage detector and detects a voltage of each of the cells C1 to C4 independently and transmits a detection result to the controller 22. The voltage detection circuit 21 may be configured to detect a voltage of the assembled battery 11 as a whole. The current detection circuit 23 detects a charge current and a discharge current flowing through the assembled battery 11 (hereinafter, referred to as a charge/discharge current) and transmits a detection result to the controller 22.

The BMS 13 includes the voltage detection circuit 21 and the current detection circuit 23 and may further include various detectors (not illustrated) such as a temperature sensor that detects temperature of the assembled battery 11. The BMS 13 may monitor various conditions of the assembled battery 11 such as an internal resistance or a state of charge (hereinafter, simply referred to as a SOC) of the assembled battery 11 based on a detection result of the detectors.

The controller 22 includes a central processing unit (hereinafter, CPU) 22A, and a memory 22B. The memory 22B stores various programs for controlling operations of the controller 22 (including a program for performing a secondary battery protection process that will be described later). The CPU 22A controls each part of the electric storage apparatus 1 according to a program read from the memory 22B. The memory 22B includes a RAM and a ROM. The various programs may be stored in medium such as the RAM or a non-volatile memory such as a CD-ROM, a hard disc device, or a flash memory. The controller 22 is supplied with electric power from the assembled battery 11 to be driven.

When receiving the open command signal from the controller 22, the first relay 12A mechanically opens the contact point (in the open state or the OFF state) by the electromagnetic action. When receiving the close command signal from the controller 22, the first relay 12A mechanically closes the contact point (in the closed state or the ON state) by the electromagnetic action. The second relay 12B has a configuration same as the first relay 12A.

The equalization circuit 25 substantially equalizes the voltages of the four cells CN. Specifically, the equalization circuit 25 includes four discharge circuits HD1 to HD4 each of which is connected in parallel to each of the cells C1 to C4. Each discharge circuit HD includes the switching component 25A and a discharge resistance 25B that are connected in series. The discharge circuit HD is one example of the discharger.

The controller 22 provides the close command signal to the switching component 25A of each discharge circuit HD and makes the switching component 25A to be in the closed state. Accordingly, the controller 22 discharges the electric power from the cells C1 to C4 via the discharge resistance 25B to lower the voltage values of the cells C1 to C4. The cells C1 to C4 are connected in parallel to the equalization circuit 25. When determining that it is not necessary to lower the voltage values of the cells C1 to C4, the controller 22 provides the open command signal to the switching component 25A of each discharge circuit HD and makes the switching component 25A to be in the open state.

Lithium Iron Phosphate Secondary Battery

Problems that may be caused in charging a lithium iron phosphate secondary battery will be described with reference to FIGS. 2 and 3. An OCV-SOC curve P is illustrated by a solid line in FIG. 2. The OCV-SOC curve P represents variation characteristics (correlation) between an open circuit voltage (hereinafter, referred to as an OCV) and a SOC of the cell C. The OCV is a terminal voltage of the cell C in a stable state. For example, the OCV is a terminal voltage of the cell C when the voltage change amount of the cell C in a unit time period is a certain amount or less. The certain amount is previously determined based on a spec of the cell C or certain experiments. Data regarding the OCV-SOC curve P is stored in the memory 22B.

Figure 2:
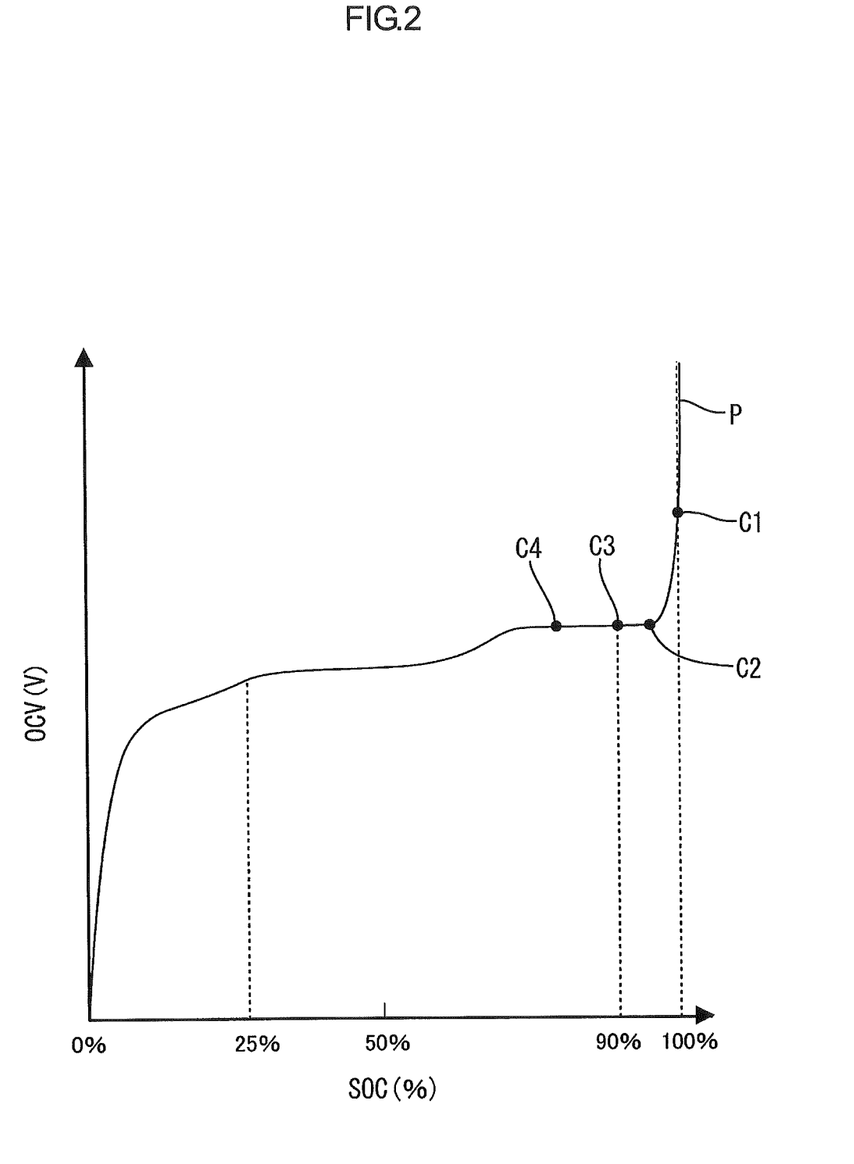
FIG. 2 is a graph illustrating a relationship between an OCV and a SOC.

As illustrated in FIG. 2, the graph illustrating relation of the SOC and the OCV of the lithium iron phosphate secondary battery has a flat region (a plateau region) where the change ratio of the OCV is relatively small and a change region where the change ratio of the OCV is relatively great. The change ratio of the OCV represents a change amount of the OCV in a unit change amount of the SOC. Specifically, the region of the graph in FIG. 2 close to the SOC from 25% to 97% is the flat region where the change ratio of the OCV is relatively small, and the region of the graph close to the SOC of 25% and less and the SOC of 97% and more is the change region where the change ratio of the OCV is relatively great.

The lithium iron phosphate secondary battery has the above characteristics, and for example, if the SOC is close to 100%, the change ratio of the OCV is extremely great, and therefore, even if the SOC slightly increases, the voltage of each cell CN promptly increases and greatly exceeds the maximum charge voltage value. A secondary battery protection process that will be described later is effectively performed for the assembled battery 11 including the cells that are connected in series.

Figure 3:
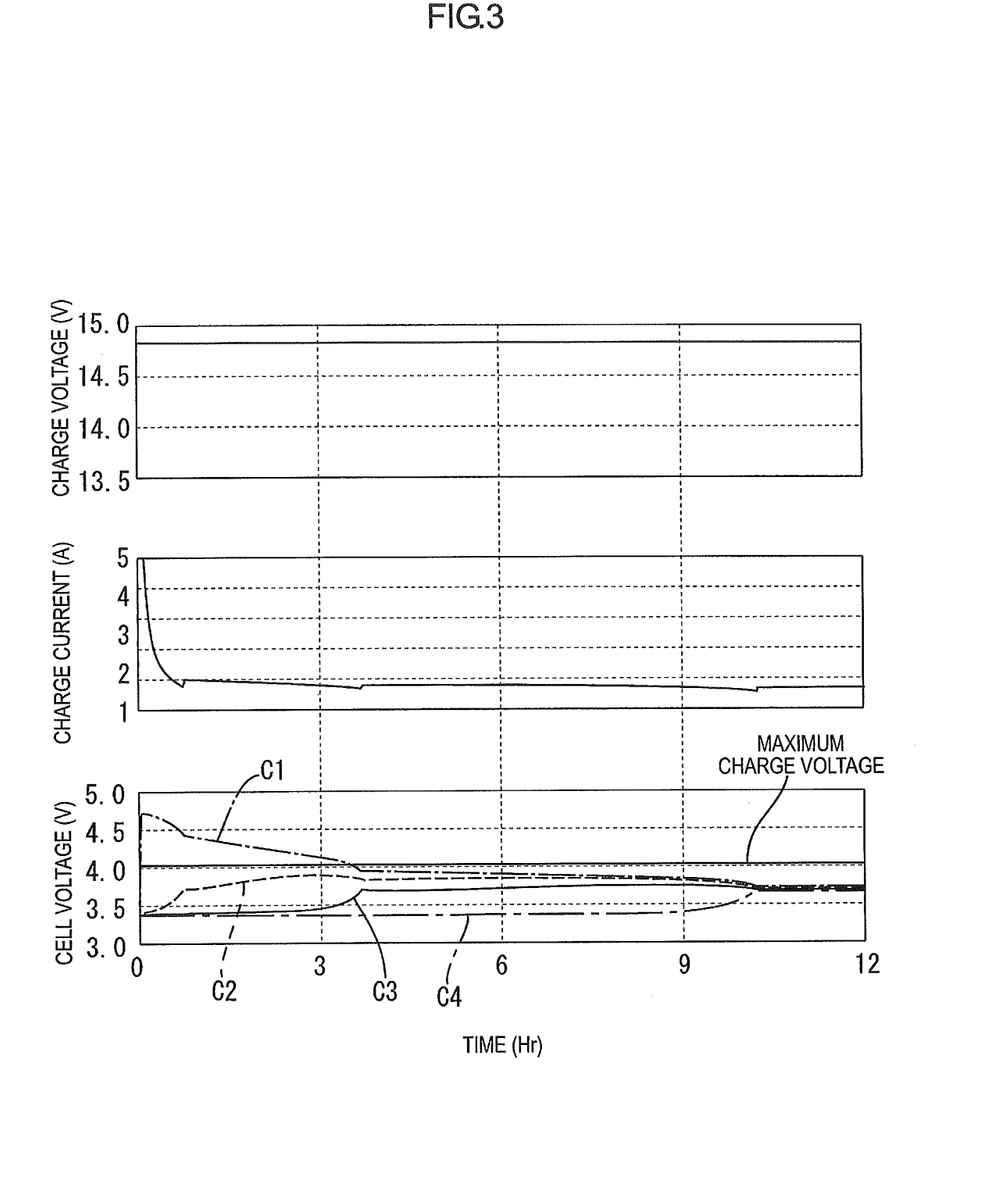
FIG. 3 is a graph illustrating a cell current and a cell voltage according to elapsed time when each cell is charged with a constant voltage.

If the SOC of each of the cells C1 to C4 varies, for example, the SOC of the cell C1 in FIG. 1 is 100%, the SOC of the cell C2 is 95%, the SOC of the cell C3 is 90%, and the SOC of the cell C4 is 80% and the assembled battery 11 is charged with a constant voltage, a problem may be caused as illustrated in FIG. 3.

In the example illustrated in FIG. 3, the electric storage apparatus 1 is charged with a constant voltage of 14.8 V. In the graph illustrated in an upper portion of FIG. 3, the vertical axis represents a charge voltage (V) of the assembled battery 11 and the horizontal axis represents time (hr). In the graph illustrated in a middle portion of FIG. 3, the vertical axis represents a charge current (A) of the assembled battery 11 and the horizontal axis represents time (hr). In the graph illustrated in a lower portion of FIG. 3, the vertical axis represents a cell voltage (V) of the cell C and the horizontal axis represents time (hr).

Even if the SOC of each of the cells C1 to C4 varies, the charger such as the alternator 5 just charges the assembled battery 11 with a constant voltage. The charger does not perform the constant voltage charging with monitoring the cell voltage of each of the cells C1 to C4. Therefore, the variation in the SOC of the cells C1 to C4 will not be removed. The MBS 13 includes the equalization circuit 25 to remove the variation. Specifically, each discharge circuit HD of the equalization circuit 25 discharges electric power from each of the four cells CN to lower the voltage value of each of the four cells CN. This substantially equalizes the voltages of the four cells CN.

However, it takes predetermined time for the discharging via each discharge circuit HD of the equalization circuit 25. Therefore, for example in FIG. 3, after the cell voltage of the cell C1 exceeds the maximum charge voltage value (for example, 4.0 V) that is determined based on a spec of the cell C1, the constant voltage charging is performed. This is caused because the SOC of the cell C1 before starting the constant voltage charging is in the change region.

The SOC of each of the cells C2 to C4 before starting the constant voltage charging is in the plateau region. Therefore, even if the constant voltage charging starts and the SOC increases, the OCV is less likely to change. However, the SOC of the cell C1 before starting the constant voltage charging is in the change region. Therefore, if the constant voltage charging for the cell C1 is started and the SOC increases even slightly, the OCV increases rapidly. As a result, after the cell voltage of the cell C1 exceeds the maximum charge voltage value, the constant voltage charging is performed for the cell C1, and this may deteriorate the cell C1.

Secondary Battery Protection Process

Figure 4:
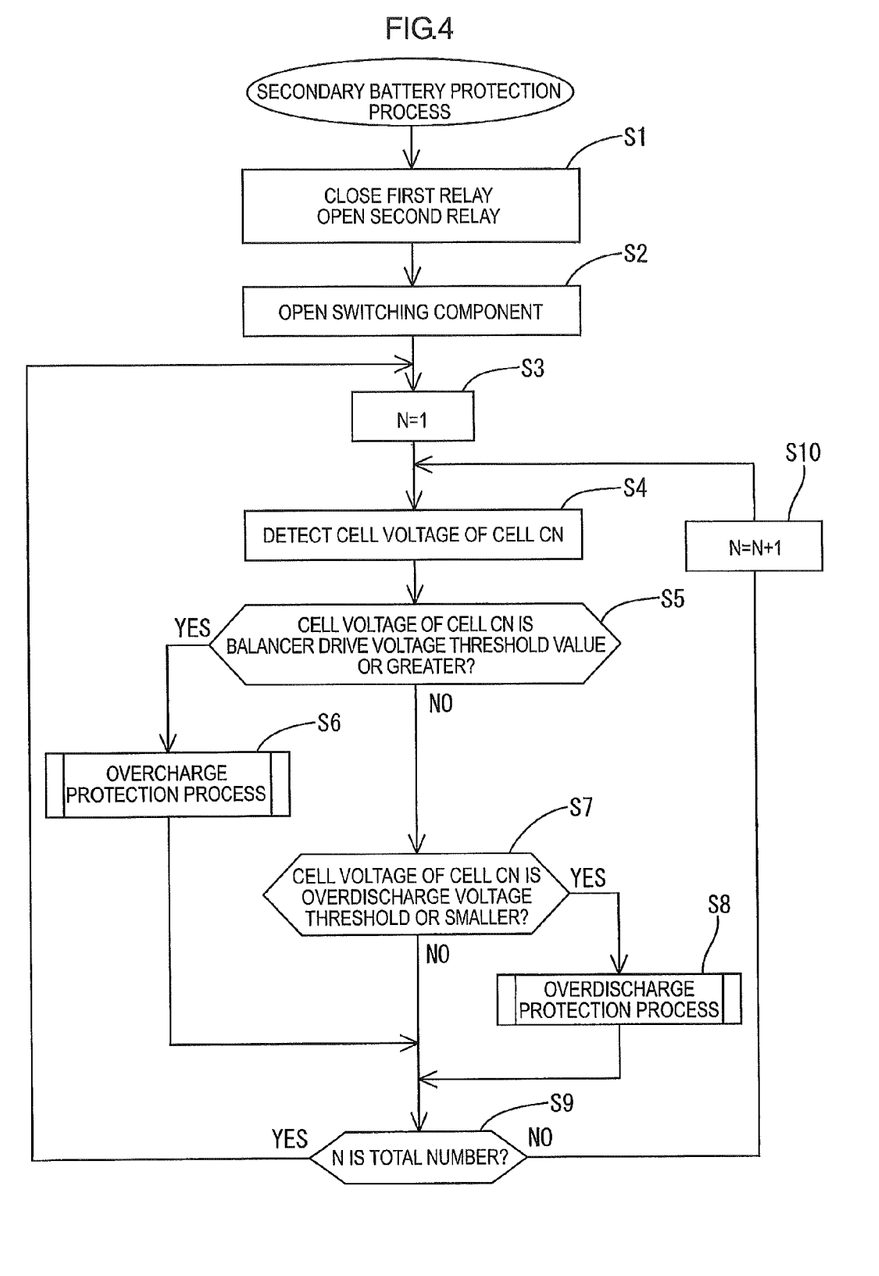
FIG. 4 is a flowchart illustrating a secondary battery protection process.

The controller 22 always performs a secondary battery protection process illustrated in FIG. 4 while being supplied with power source from the assembled battery 11.

The secondary battery protection process is performed so as not to perform the constant voltage charging for the assembled battery 11 in a state that the cell voltage of each cell C1 to C4 is greater than the maximum charge voltage value. Specifically, the controller 22 performs an initial process to make the first relay 12A to be a closed state and make the second relay 12B to be an open state (S1). Accordingly, in a normal state, the charge/discharge current flows not via the diode D, and therefore, the heating by the diode D does not occur. The process of S1 is an example of a first process.

Next, the controller 22 makes the switch components 25A of the discharge circuits HD1 to HD4 (S2) to be in the open state. The process of S2 is an example of a stop process.

Next, the controller 22 initializes the number N of the Nth cell CN to be one (S3) and detects a voltage value of the Nth cell CN (S4). The controller 22 determines whether the voltage value of the Nth cell CN detected in S4 is a balancer drive voltage threshold value (for example, 3.6 V) or greater (S5) and determines whether the Nth cell CN is close to an overcharge state (one example of an overcharge state that is caused due to a current flowing in a reverse direction of the rectifier component). By comparing the voltage value of the Nth cell CN and the balancer drive voltage threshold value, the controller 22 determines whether to drive the equalization circuit 25 and make the switching component 25A to be in the closed state.

If determining that the voltage value of the Nth cell CN is the balancer drive voltage threshold value or greater (S5: YES), the controller 22 determines that the Nth cell CN is close to the overcharge state and performs an overcharge protection process illustrated in FIG. 5 (S6). A range of voltages smaller than the balancer drive voltage threshold value is an example of a reference range. The process of S5 is an example of a process in which it is determined whether the electric storage device is in a first state or a second state. A state in which the voltage value of the Nth cell CN is the balancer drive voltage threshold value or greater is one example of the second state.

Overcharge Protection Process

Figure 5:
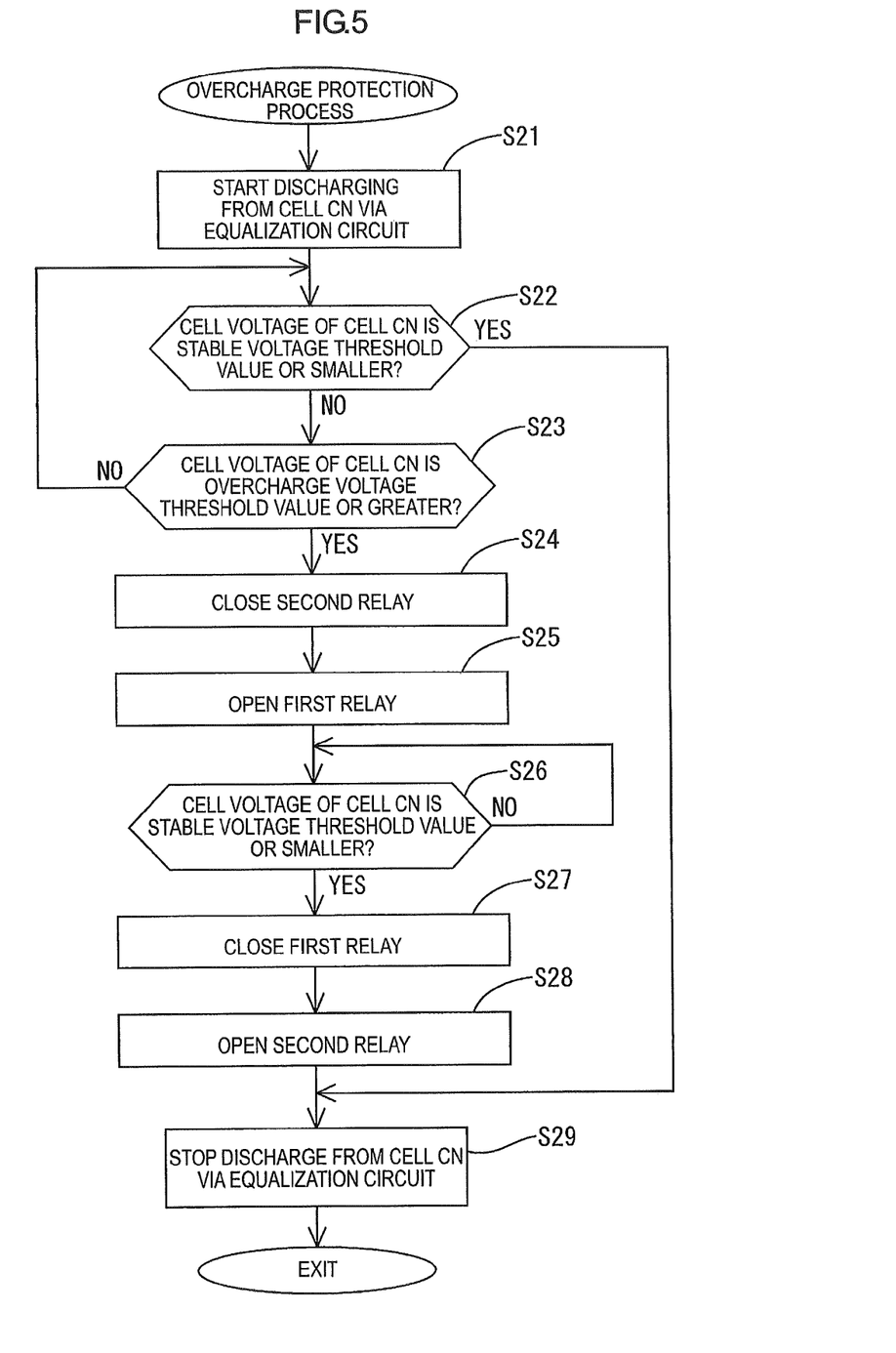
FIG. 5 is a flowchart illustrating an overcharge protection process.

The overcharge protection process is performed such that the Nth cell CN does not become in the overcharge state. In the overcharge protection process, the controller 22 discharges electric power from the Nth cell CN via the discharge circuit HD of the equalization circuit 25. Specifically, the controller 22 makes the switch component 25A that is connected in parallel to the Nth cell CN to be in the closed state (S21). The process of S21 is an example of a discharge process.

The controller 22 determines whether the voltage value of the Nth cell CN is a stable voltage threshold value (for example, 3.5 V) or smaller (S22). By performing the process of S22, the controller 22 determines whether the electric power of the Nth cell CN is discharged via the discharge circuit HD of the equalization circuit 25 and the voltage value of the Nth cell CN is lowered to be the stable voltage threshold value that is a stable voltage.

When determining that the voltage value of the Nth cell CN is the stable voltage threshold value or smaller (S22: YES), the controller 22 makes the switch component 25A to be in the open state (S29) and terminates the overcharge protection process and proceeds to S9 in FIG. 4. The controller 22 determines that the electric power is discharged from the Nth cell CN via the discharge circuit RD of the equalization circuit 25 and the voltage value of the Nth cell CN is lowered.

When determining that the voltage value of the Nth cell CN is greater than the stable voltage threshold value (S22: NO), the controller 22 determines whether the voltage value of the Nth cell CN is the overcharge voltage threshold value (for example, 3.7 V) or greater (S23) to determine whether the Nth cell CN is further closer to the overcharge state. When the controller 22 determines that the voltage value of the Nth cell CN is smaller than the overcharge voltage threshold value (S23: NO), the process returns to S22 to continue discharging the electric power of the Nth cell CN only via the discharge circuit HD of the equalization circuit 25.

When the controller 22 determines that the voltage value of the Nth cell CN is the overcharge voltage threshold value or greater (S22: YES), the following processes will be performed to continue discharging the electric power from the Nth cell CN via the discharge circuit HD of the equalization circuit 25 and restrict the charging of the Nth cell CN. If the electric power is discharged from the Nth cell CN only via the discharge circuit HD of the equalization circuit 25, it takes long time to discharge the electric power and it is difficult to lower the voltage value of the Nth cell CN quickly.

The controller 22 makes the second relay 12B to be in the closed state (S24) and makes the first relay 12A to be in the open state (S25). The processes of S24 and S25 are examples of the second process.

As described before, the diode D is connected in series to the second relay 12B so as to block the current flowing to the assembled battery 11 (one example of a current flowing in a reverse direction of the rectifying component). Therefore, when the controller 22 performs the process of S25, the charge path formed by the first relay 12A between the alternator 5 and the assembled battery 11 is disconnected and this blocks the charge current flowing from the alternator 5 to the assembled battery 11. Accordingly, the Nth cell CN is in a state that the charging is not performed.

The diode D is connected to the second relay 12B such that the current flows from the assembled battery 11 to the in-vehicle device 4. Therefore, as a result of the processes of S24 and S25, a discharge path is formed by the second relay 12B between the in-vehicle device 4 and the assembled battery 11, and accordingly, the discharge current flows from the assembled battery 11 to the in-vehicle device 4 via the discharge path. Therefore, the Nth cell is in a state that only discharging is performed.

The process of S24 is performed such that the discharge path between the in-vehicle device 4 and the assembled battery 11 is not disconnected for a moment. Hereinafter, the process will be described specifically with reference to FIG. 6. In a configuration illustrated in an upper portion of FIG. 6, the first relay 12A is in the closed state and the second relay 12B is in the open state (case 1), in a configuration illustrated in a middle portion of FIG. 6, the first relay 12A is in the closed state and the second relay 12B is in the closed state (case 2), and in a configuration illustrated in a lower portion of FIG. 6, the first relay 12A is in the open state and the second relay 12B is in the closed state (case 3). The engine 2, the starter 3, the voltage detection circuit 21 and the current detection circuit 23 are not illustrated in FIG. 6.

Figure 6:
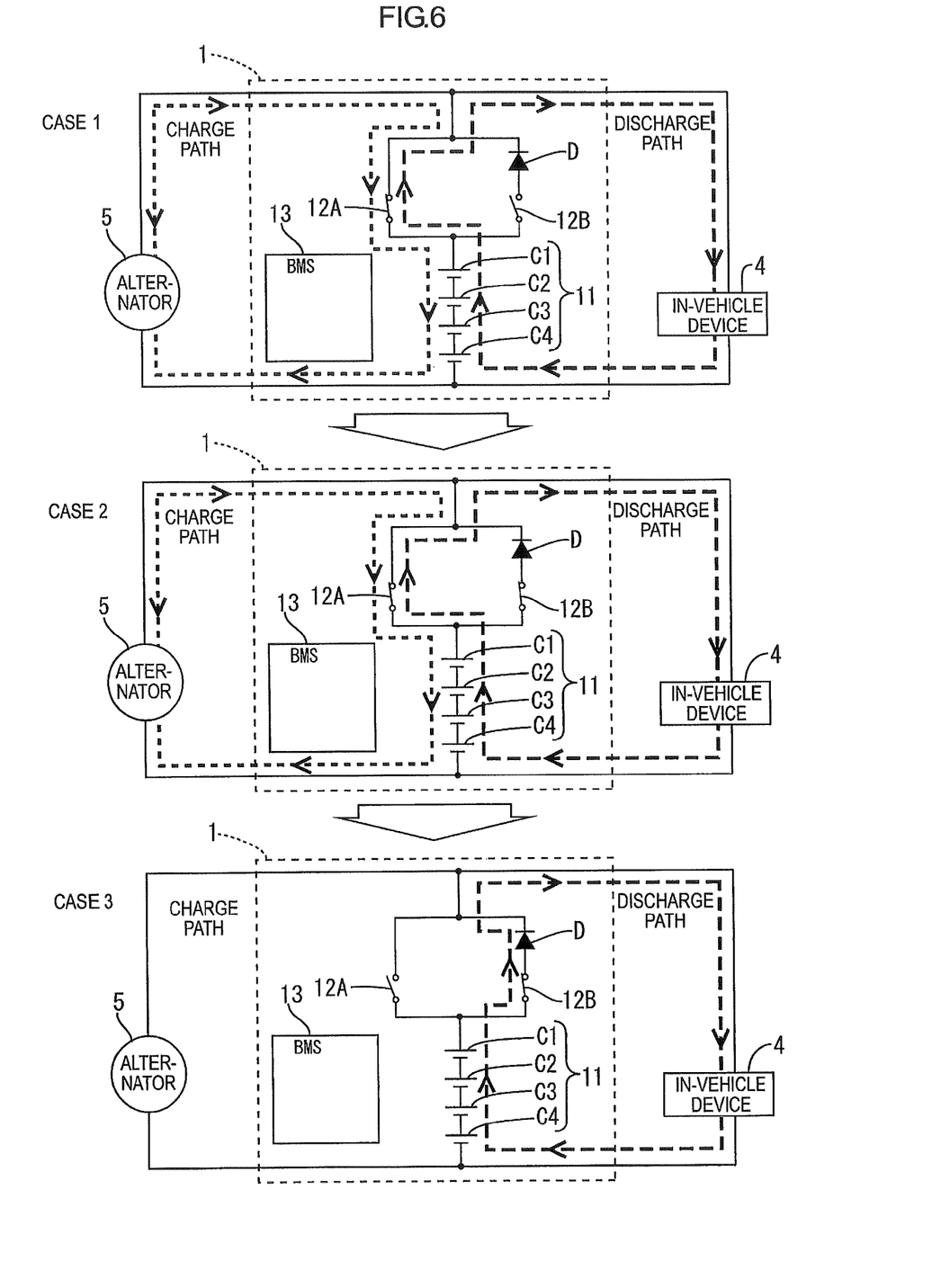
FIG. 6 is a transition diagram illustrating switching of a switch in the overcharge protection process.

In the case 1, the first relay 12A is in the closed state. Therefore, the current path is formed between the assembled battery 11 and each of the in-vehicle device 4 and the alternator 5, and the charge/discharge current flows through the assembled battery 11 via the first relay 12A.

In the case 2, the diode D is connected in series to the second relay 12B so as to block the current flowing to the assembled battery 11. Therefore, the charge current does not flow through the assembled battery 11 via the second relay 12B.

The second relay 12B is connected in parallel to the first relay 12A, and the diode D is connected in series to the second relay 12B between the pair of common connection points K1, K2 each of which is commonly connected to the first relay 12A and the second relay 12B. Therefore, the current path generated by the second relay 12B has a greater synthesized component of a circuit resistance compared to a current path formed by the first relay 12A, and accordingly, the discharge current does not flow from the assembled battery 11 via the second relay 12B. Therefore, also in the case 2, the charge/discharge current flows through the assembled battery 11 via the first relay 12A.

In the case 3, only the discharge path is formed by the second relay 12B and therefore, only the discharge current flows from the assembled battery 11.

If the controller 22 shifts the condition of the electric storage apparatus 1 from the case 1 to the case 3 directly without going through the case 2, the discharge path between the in-vehicle device 4 and the assembled battery 11 may be disconnected temporally. For example, when the controller 22 provides the open command signal to the first relay 12A and provides the close signal to the second relay 12B at the same time, both of the first relay 12A and the second relay 12B are in the open state for a moment. Therefore, the power supply from the assembled battery 11 to the in-vehicle device 4 is temporally interrupted and accordingly, jumpiness in the audio sound or flicker of the head light may occur or a vehicular control system such as an engine or braking may become unstable, for example.

The controller 22 shifts the condition of the electric storage apparatus 1 from the case 1 to the case 3 with going through the case 2, and accordingly, the short temporal disconnection of the discharge path between the in-vehicle device 4 and the assembled battery 11 is less likely to occur.

After the process of S25, the controller 22 determines whether the voltage value of the Nth cell CN is the stable voltage threshold value or smaller (S26). The controller 22 determines whether the electric power is discharged from the Nth cell CN and the voltage value of the Nth cell CN is lowered by performing the process of S26.

When determining that the voltage value of the Nth cell CN is greater than the stable voltage threshold value (S26: NO), the controller 22 waits. When determining that the voltage value of the Nth cell CN is the stable voltage threshold value or smaller (S26: YES), the controller 22 determines that the electric power is discharged from the Nth cell and the voltage value of the Nth cell CN is lowered, and returns the assembled battery 11 to be in a chargeable/dischargeable state. Specifically, the controller 22 makes the first relay 12A to be in the closed state (S27) and makes the second relay 12B to be in the open state (S28).

The controller 22 performs the process of S28 after performing the process of S27 to prevent the short disconnection of the discharge path between the in-vehicle device 4 and the assembled battery 11 as described before. The process of S27 and the process of S28 are examples of the first process.

The controller 22 terminates the discharging from the cell CN via the equalization circuit 25. Specifically, the controller 22 makes the Nth switch component 25A to be in the open state (S29). The Nth switch component 25A is connected in parallel to the Nth cell CN. Accordingly, the controller 22 terminates the overcharge protection process and the process proceeds to S9 in FIG. 4. The process of S29 is an example of the stop process.

When determining that the voltage of the electric storage device is in the reference range, the controller 22 performs discharging by the discharger and when determining that the voltage of the electric storage device is not in the reference range, the controller 22 performs the second process.

When determining that the voltage value of the Nth cell CN is smaller than the balancer drive voltage threshold value (S5: NO), the controller 22 determines whether the voltage value of the Nth cell CN is an overdischarge voltage threshold value (for example, 3.25 V) or smaller (S7) to determine whether the Nth cell CN becomes closer to the overcharge state. By comparing the voltage value of the Nth cell CN and the overcharge voltage threshold value, the controller 22 determines whether to perform an overcharge protection process. When determining that the voltage value of the Nth cell CN is the overcharge voltage threshold value or smaller (S7: YES), the controller 22 performs the overcharge protection process illustrated in FIG. 7 (S8).

A range of voltage values greater than the overcharge voltage threshold value is an example of the reference range. The process of S7 is an example of the process of determining whether the voltage value is in the reference range, and the state in which the voltage value of the Nth cell CN is the overdischarge voltage threshold value or smaller is an example of the third state.

Overdischarge Protection Process

Figure 7:
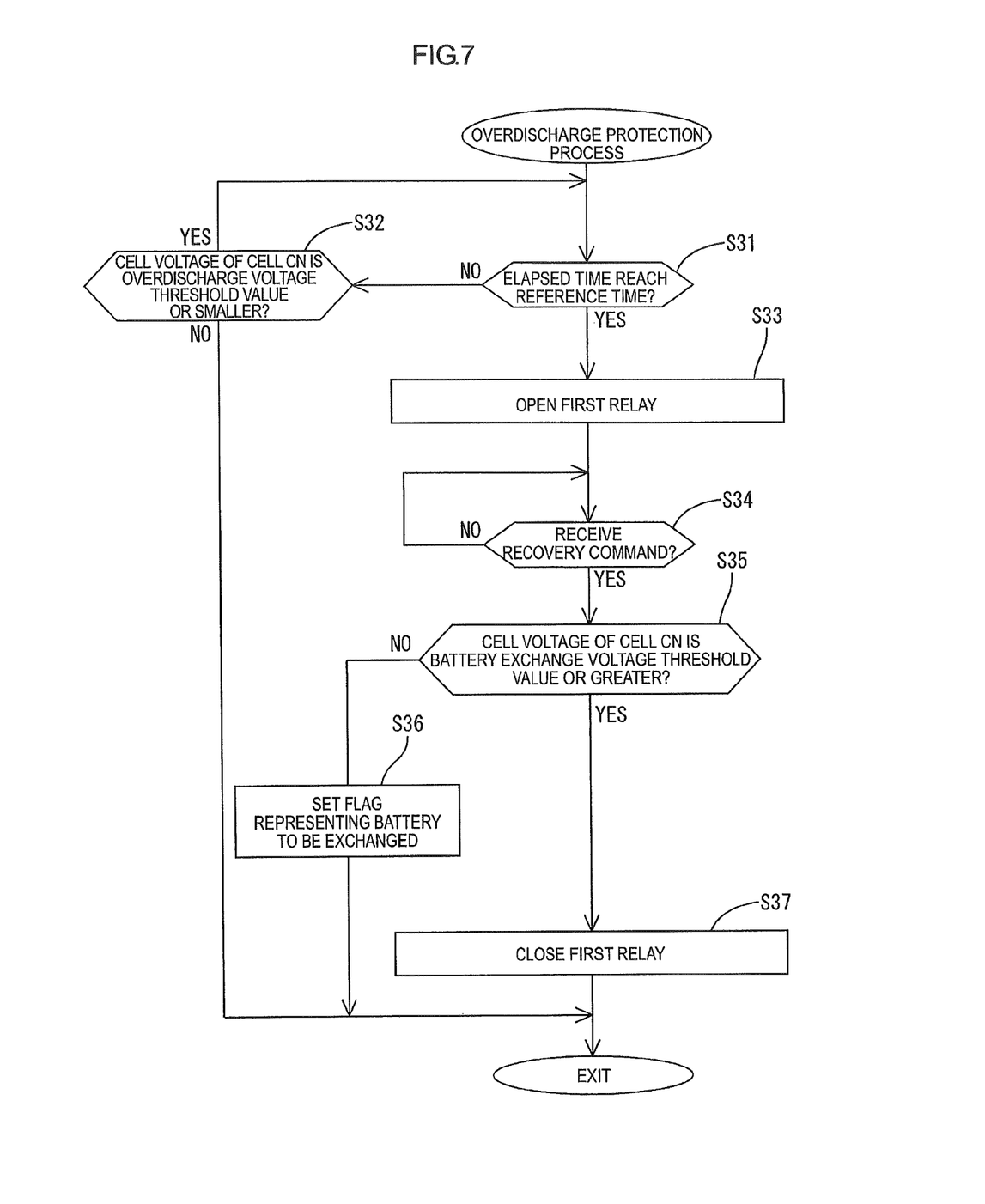
FIG. 7 is a flowchart illustrating an overdischarge protection process.

The overdischarge protection process is performed such that the Nth cell does not become in the overdischarge state (one example of the overdischarge state caused by a current flowing in a forward direction of the rectifier component). Specifically, in the overdischarge protection process, the controller 22 measures elapsed time from the execution of the overdischarge protection process and determines whether the elapsed time reaches reference time (for example, thirty seconds) (S31). When determining that the elapsed time does not reach the reference time (S31: NO), the controller 22 determines whether the voltage value of the Nth cell CN is the overdischarge voltage threshold value or smaller (S32).

When the controller 22 determines that the voltage value of the Nth cell CN is greater than the overdischarge voltage threshold value (S32: NO), the voltage value of the Nth cell CN is lowered to be the overdischarge threshold value or smaller due to temporal voltage dropping, and therefore, the controller 22 terminates the overdischarge protection process. The process proceeds to S9 in FIG. 4.

When the controller 22 determines that the voltage value of the Nth cell CN is the overdischarge threshold value or smaller (S32: YES), the process returns to S31.

In S31, when determining that the elapsed time reaches the reference time (S31: YES), the controller 22 makes the first relay 12A to be in the open state (S33) and disconnects the discharge path between the in-vehicle device 4 and the assembled battery 11. This stops the discharge current (one example of current flowing in the forward direction of the rectifier component) flowing from the assembled battery 11.

After the process of S33, the controller 22 determines whether to receive a recovery command (S34). The recovery command is transmitted to the electric storage apparatus 1 from an electronic control unit of a vehicle (hereinafter, referred to as an ECU) according to driver's actions such as moving an ignition switch to an ignition position or pressing on an accelerator of a vehicle that is in an idling stop state, for example.

When determining that the controller 22 does not receive the recovery command (S34: NO), the controller 22 waits. When determining that the controller receives the recovery command (S34: YES), the controller determines whether the voltage value of the Nth cell CN is a battery exchange voltage threshold value (for example, 2.8 V) or greater (S35). The controller 22 determines whether the Nth cell CN is in the overdischarge state by comparing the voltage value of the Nth cell CN and the battery exchange voltage threshold value. When determining that the voltage value of the Nth cell CN is smaller than the battery exchange voltage threshold value (S35: NO), the controller 22 determines that the Nth cell is in the overdischarge state and stores in the memory 22B a flag representing that the electric storage apparatus 1 is required to be exchanged (S36). Then, the controller 22 terminates the overdischarge protection process and the process proceeds to S9 in FIG. 4.

When determining that the Nth cell CN is in the overdischarge state and it is required to exchange the electric storage apparatus 1, the controller 22 may perform an error process and output an inform signal to an external device such as the ECU, for example. For example, the inform signal represents that the electric storage apparatus 1 is required to be exchanged.

When determining that the voltage value of the Nth cell CN is the battery exchange voltage threshold value or greater (S35: YES), the controller 22 determines that the Nth cell CN is not in the overdischarge state and returns the assembled battery 11 to be in a chargeable/dischargeable state. Specifically, the controller 22 makes the first relay 12A to be in the closed state (S37) and terminates the overdischarge protection process, and the process proceeds to S9 in FIG. 4. The overdischarge protection process is an example of the third process and the process of S37 is an example of the first process.

The controller 22 determines whether the number N of the Nth cell CN reaches a total number (=4) (S9). When the controller 22 determines that the number N of the Nth cell CN reaches the total number (S9: YES), the process returns to S3 and the controller 22 performs the processes after S3 again regarding the first cell C1. On the other hand, when determining that the number N of the nth cell CN does not reach the total number (S9: NO), the controller 22 adds one to the number N of the Nth cell CN (S10) and the process returns to S4 and the processes will be performed from S4.

Effects of this Embodiment

According to this embodiment, the electric storage apparatus 1 includes the first relay 12A, the second relay 12B that is connected in parallel to the first relay 12A, and the diode D that is connected in series to the second relay 12B between the pair of common connection points K1, K2 that are commonly connected to the first relay 12A and the second relay 12B. In the electric storage apparatus 1, the controller 22 performs the overcharge protection process and the overdischarge protection process. Specifically, when performing the overdischarge protection process, the controller 22 makes the first relay 12A and the second relay 12B to be in the open state. Accordingly, the assembled battery 11 is protected from becoming in the overdischarge state. When performing the overcharge protection process, the controller 22 makes the second relay 12B to be in the closed state, and then makes the first relay 12A to be in the open state. Accordingly, the discharge path from the assembled battery 11 is maintained with protecting the assembled battery 11 from becoming in the overcharge state. When the assembled battery 11 is in a normal state, the second relay 12B becomes in the open state and the first relay 12A becomes in the closed state to generate a current path between the assembled battery 11 and the in-vehicle device 4. The charge/discharge current flows in the current path, and therefore, heating is less likely to occur on the current path compared to a configuration in which the rectifier component such as the diode D is arranged on the current path.

Other Embodiments

The present invention is not limited to the embodiments described above and illustrated in the drawings. The following various embodiments are also included in the technical scope of the present invention.

In the above embodiment, the controller 22 includes one CPU 22A and the memory 22B. However, the controller may not be limited thereto and may include a plurality of CPUs or include a hardware circuit such as an application specific integrated circuit (ASIC) or may include both of a hardware circuit and a CPU. For example, a part or all of process steps of the secondary battery protection process may be performed by separate CPUs or hardware circuits. The execution order of the process steps may be altered if necessary.

In the above embodiment, examples of the switch include the first relay 12A and the second relay 12B of the contact type. However, the switch is not limited thereto but may be a semiconductor component such as a bipolar transistor and MOSFET or may be a relay of a normal closed type. The relay of a normal closed type is normally in the closed state and becomes in the open state only when receiving an open command signal. The switching component 25A of the discharge circuit HD (one example of the discharger) may have a configuration same as the modifications of the first relay 12A and the second relay 12B described above.

In the above embodiment, the assembled battery 11 including multiple cells that are connected in series is used as an example of the electric storage device. However, the electric storage device is not limited thereto but may be an electric cell including one cell or may be one including multiple cells that are connected to each other in parallel. The electric storage device may include two, three, five or more cells and the number of cells included in the electric storage device may be altered if necessary. The electric storage device does not necessarily include the iron phosphate-based material as the positive electrode active material but may include at least an iron component. The electric storage device does not necessarily include the negative electrode formed by a graphite-based material. The electric storage device may be other secondary batteries such as a lead-acid battery, a manganese-type lithium-ion battery. The electric storage device is not necessarily a secondary battery but may be a capacitor or an electric double layer capacitor.

In the above embodiment, the electric storage device includes the iron phosphate-based material as the positive electrode active material. However, a small amount of a specific lithium compound may be mixed with the iron phosphate-based material and the obtained mixture may be used as the positive electrode active material. The specific lithium compound has an OCV greater than the OCV of the iron phosphate-based material in the plateau region. Examples of the specific lithium compound preferably include $LiCo_2$, $LiNiO_2$ of a nickel type, $LiMn_2O_4$ of a manganese type, and Li—Co—Ni—Mn type oxide. A ratio of the specific lithium compound to the iron phosphate-based material is preferably five percent by weight or less. Accordingly, the OCV change ratio in the SOC range of the electric storage device close to 100% becomes small and the range of the OCV-SOC curve P of the electric storage device having great change is reduced and therefore, the SOC is easily estimated. This makes charge/discharge control to be performed easily. The overcharge or overdischarge is less likely to be caused in the electric storage device.

Figure 8:
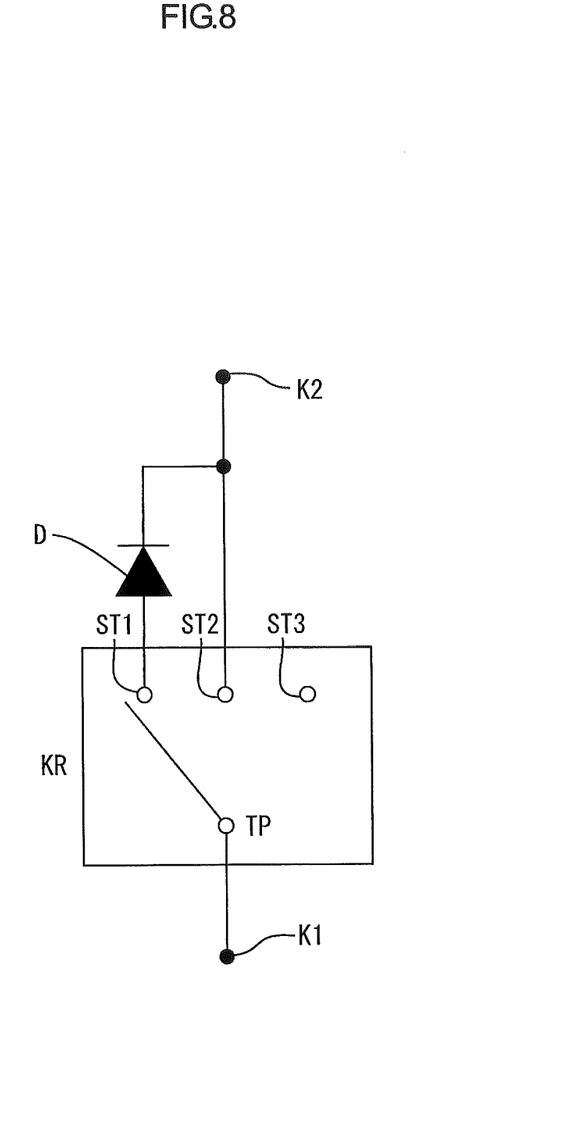
FIG. 8 is a circuit diagram illustrating a connection state of a three-points switching relay.

In the above embodiment, the two relays including the first relay 12A and the second relay 12B are connected to each other in parallel. However, a three-points switching relay KR illustrated in FIG. 8 may be used. The three-points switching relay KR includes three contact points ST1 to ST3 and a contact point TP that is connected to the assembled battery 11. The contact point ST1 is connected to a circuit that is connected to the diode D, the contact point ST2 is connected to a circuit that is not connected to the diode D, and the contact point ST3 is not connected to any circuit. In case of using the three-points switching relay KR, the controller 22 provides a switch command signal to the three-points switching relay KR and connects one of the three contact points ST1, ST2, ST3 of the three-points switching relay KR to the contact point TP. The three-points switching relay KR including the multiple contact points ST1 to ST3 is an example of switches.

In the above embodiment, the diode D is used as an example of the rectifier component. However, the rectifier component may be a semiconductor component such as MOSFET that is connected to the diode, for example. The rectifier component may be a circuit providing a function similar to that of the diode.

In the above embodiment, the voltage detection circuit 21 detects the voltage of each of the cells C1 to C4 independently and transmits the detection result to the controller 22. However, the ECU may detect the voltage of each of the cells C1 to C4 independently and the BMS 13 may receive a signal from the ECU.

In the above embodiment, the alternator 5 does not include a control circuit for the charge control. However, the alternator 5 may include a control circuit for the charge control. The charger may not be necessarily arranged in a vehicle like the alternator 5 but may be an external charger such as a charging stand or a battery charger.

In the above embodiment, the circuit switch 12 is arranged between the assembled battery 11 and the in-vehicle device 4 and between the assembled battery 11 and the alternator 5. However, the circuit switch 12 may be arranged between a battery plus terminal BP and the alternator 5 or may be arranged between the battery plus terminal BP and the in-vehicle device 4.

In the above embodiment, the voltage detection circuit 21 detects the voltage of each of the cells C1 to C4 independently and transmits the detection result to the controller 22. However, the voltage detection circuit 21 may detect a voltage of the whole assembled battery 11. In the configuration where the voltage detection circuit 21 detects a voltage of the whole assembled battery 11, the processes of S3, S9, S10 in FIG. 4 are not necessary and the balancer drive voltage threshold value, the overdischarge voltage threshold value used in the process in FIG. 4, the stable voltage threshold value, the overcharge voltage threshold value used in the process in FIG. 5, and the battery exchange voltage threshold value used in the process in FIG. 7 may be altered from the threshold value of each of the cells C1 to C4 to the threshold value of the whole assembled battery 11. For example, each of the threshold values may be quadrupled or the plateau voltage may be tripled and the overcharge threshold value of one of the cells C1 to C4 may be added to the tripled plateau voltage to obtain the threshold value of the whole assembled battery 11. One example of a formula of adding the overcharge threshold value of one of the cells C1 to C4 to the tripled plateau voltage is as follows.

Plateau voltage (3.3 V)*3+overcharge threshold value (4.0 V)*1=approximately 14.0 V (threshold value of the whole assembled battery 11)

Only the cell C that has a maximum voltage may be connected to the discharge circuit HD.

In the above embodiment, the balancer drive voltage threshold value and the overdischarge voltage threshold value are examples of the threshold value that determines the reference range. The balancer drive voltage threshold value is smaller than a lower limit value that causes each of the cells C1 to C4 to be in the overcharge state, and this prevents each of the cells C1 to C4 from becoming in the overcharge state. The overdischarge voltage threshold value is greater than an upper limit value that causes each of the cells C1 to C4 to be in the overdischarge state, and this prevents each of the cells C1 to C4 from becoming in the overdischarge state. However, the balancer drive voltage threshold value may be substantially equal to the lower limit value that causes each cell C1 to C4 to be in the overcharge state and the overdischarge voltage threshold value may be substantially equal to the upper limit value that causes each cell C1 to C4 to be in the overdischarge state. Accordingly, even if the cell C1 to C4 becomes in the overcharge state or the overdischarge state, the cell C1 to C4 is not continuously kept in that state.

In the above embodiment, the controller 22 detects a cell voltage of each of the four cells CN one by one and compares the detected voltage and the corresponding threshold value and performs the overcharge protection process and the overdischarge protection process. However, the controller 22 may detect the cell voltages of all of the four cells CN first and compare the cell voltages and the corresponding threshold value sequentially from a greatest one of the detected cell voltages and perform the overcharge protection process.

In the above embodiment, when determining that the voltage of the electric storage device is in the reference range, the controller 22 controls the discharger to perform the discharge process. When determining that the voltage of the electric storage device is not in the reference range, the controller 22 performs the second process. However, when determining that the voltage of the electric storage device is not in the reference range, the controller 22 may perform the second process and thereafter, when determining that the voltage of the electric storage device is in the reference range, the controller 22 may control the discharger to perform the discharge process.

In the above embodiment, when the assembled battery 11 is in the voltage abnormal state such as the overcharge state or the overdischarge state, it is considered as the abnormal state of the assembled battery 11. However, a temperature abnormal state or a current abnormal state may be considered as the abnormal state of the assembled battery 11. When a detection result of temperature of the assembled battery 11 detected by a temperature sensor is higher than a reference threshold value, the assembled battery 11 is in the temperature abnormal state. When a charge/discharge current flowing through the assembled battery 11 that is detected by the current detection circuit 23 is greater than a reference threshold value, the assembled battery 11 is in the current abnormal state.

What is claimed is:

1. An electric storage device protection apparatus, comprising:
    first and second switches arranged between an electric device and an electric storage device and connected in parallel to each other, and each of which being configured to be switched to be in an open state and a closed state;
    a rectifier component connected in series to the second switch between a pair of common connection points of the first and second switches; and
    a controller configured to perform a process to make the second switch to be in the closed state and make the first switch to be in the open state when determining that the electric storage device is in a state where a voltage of the electric storage device becomes higher than a reference range,
    wherein the first switch is directly coupled to the pair of common connection points, and
    wherein the second switch is directly coupled to the rectifier component and one of the pair of common connection points.

2. A vehicle comprising the electric storage device protection apparatus according to claim 1.

3. The electric storage device protection apparatus according to claim 1, wherein the electric storage device includes a positive electrode material including an iron phosphate-based material as a positive electrode active material.

4. The electric storage device protection apparatus according to claim 1, wherein the electric device includes a charger and a load, and
wherein the first switch, the second switch, and the rectifier component are connected to a common current path commonly arranged between the charger and the electric storage device and between the load and the electric storage device.

5. The electric storage device protection apparatus according to claim 1, wherein the rectifier component comprises a diode connected in series to the second switch such that an anode side of the diode is coupled to one of the pair of common connection points of the switches and a cathode side of the diode is coupled to the second switch.

6. An electric storage device protection apparatus, comprising:
first and second switches arranged between an electric device and an electric storage device and connected in parallel to each other, and each of which being configured to be switched to be in an open state and a closed state;
a rectifier component connected in series to the second switch between a pair of common connection points of the first and second switches; and
a controller configured to perform a process to make the second switch to be in the open state when determining that the electric storage device is in a first state where a voltage of the electric storage device is within a reference rang,
wherein the first switch is directly coupled to the pair of common connection point, and
wherein the second switch is directly coupled to the rectifier component and one of the pair of common connection points.

7. The electric storage device protection apparatus according to claim 6, wherein the controller is further configured to perform a second process to make the second switch to be in the closed state and make the first switch to be in the open state.

8. The electric storage device protection apparatus according to claim 7, wherein the controller is configured to perform the second process when determining that the electric storage device is in a second state where a voltage of the electric storage device becomes outside the reference range.

9. The electric storage device protection apparatus according to claim 6, wherein the electric storage device includes a positive electrode material including an iron phosphate-based material as a positive electrode active material.

10. A vehicle comprising the electric storage device protection apparatus according to claim 6.

11. A method of protecting an electric storage device in an electric storage device protection apparatus including switches arranged between an electric device and the electric storage device and connected in parallel to each other and configured to be switched between an open state and a closed state, and a rectifier component connected in series to one of the switches between a pair of common connection points of the switches, the method comprising:
making the one of the switches that is connected to the rectifier component to be in the closed state and make another one of the switches to be in the open state when determining that the electric storage device is in a state where a voltage of the electric storage device becomes higher than a reference range and;
providing the rectifier component that comprises a diode connected in series to the one of the switches such that an anode side of the diode is cos led to one of the pair of common connection points of the switches and a cathode side of the diode is coupled to the one of the switches,
wherein said another one of the switches is directly coupled to the pair of common connection points.

12. The method according to claim 11, wherein the electric storage device includes a positive electrode material including an iron phosphate-based material as a positive electrode active material.

* * * * *